United States Patent [19]

Tamura

[11] 4,397,537
[45] Aug. 9, 1983

[54] IMAGE FORMING METHOD AND APPARATUS

[75] Inventor: Yasuyuki Tamura, Kawasaki, Japan

[73] Assignee: Canon Kabushiki Kaisha, Tokyo, Japan

[21] Appl. No.: 238,564

[22] Filed: Feb. 26, 1981

[30] Foreign Application Priority Data

Mar. 4, 1980 [JP] Japan ................................. 55-26842

[51] Int. Cl.³ ..................... G03G 15/00; G03B 19/00
[52] U.S. Cl. ............................... 355/3 R; 355/14 R; 355/8
[58] Field of Search .............. 355/3 R, 14 R, 3 CH, 355/3 SC, 7, 8; 354/3, 6, 5; 346/153, 155

[56] References Cited

U.S. PATENT DOCUMENTS

| 4,122,462 | 10/1978 | Hirayama et al. | 354/5 |
| 4,167,324 | 9/1979 | Wu | 355/3 R |
| 4,251,152 | 2/1981 | Miyakawa et al. | 355/3 R |

Primary Examiner—A. C. Prescott
Attorney, Agent, or Firm—Fitzpatrick, Cella, Harper & Scinto

[57] ABSTRACT

An image combining system for forming on a recording medium combined images based on at least two different types of original information has the steps of modulating a light beam in accordance with electrical signal information, scanning an original by the modulated light beam, and projecting the light beam having scanned the original onto the surface of the recording medium to thereby effect recording on the surface of the recording medium.

15 Claims, 7 Drawing Figures

| | ORIGINALS | | COMBINED IMAGE | | APPLICA-BILITY |
| --- | --- | --- | --- | --- | --- |
| | MODULATED INFORMATION | DOCUMENT INFORMATION | REGULAR DEVELOPMENT | REVERSAL DEVELOPMENT | |
| P-P | A$_D$ A$_L$ | | | | |
| N-P | A$_D$ A$_L$ | B$_D$ B$_L$ | | | ○ |
| N-N | | B$_D$ B$_L$ | | | |
| P-N | | | | | |

FIG. 2
PRIOR ART

IMAGE FORMING METHOD AND APPARATUS

BACKGROUND OF THE INVENTION

1. Field of the Invention

This invention relates to an image forming method and apparatus, and more particularly to an image forming method and apparatus in which a combined image is formed on a recording medium by information provided by a beam such as a laser light modulated by video signals and an optical image from an original or the like.

2. Description of the Prior Art

In recent years, printers which record images by deflecting a laser light modulated by electrical signals and scanning a recording member such as an electrophotographic photosensitive medium by the laser light have been put into practical use. Various attempts have been made to utilize such systems to convert the output information of a computer, a word processor or the like into image information and combine such image information with the original image by an optical system.

Several practical methods and apparatus are disclosed in U.S. Pat. No. 4,122,462. Particularly, for the image combination by an optical image and a light beam such as a laser light modulated by electrical signals, there are the following two methods.

A first method effects image combination by simultaneously projecting an optical image and a modulated laser beam onto a photosensitive medium.

Generally, the optical image is utilized to provide an image with a common style utilized as a format and into which the computer output is written, and the modulated light beam is utilized to write data into the frame of the common style. That is, the frame, items, captions, etc. are formed by the optical image and the data characters, etc. are formed by the modulated light beam.

In the image combination based on the above-described method, it is difficult to obtain the aforementioned combined image unless both of the light beam modulated image and the original image are negative images. FIG. 1 of the accompanying drawings shows, by reference to the Figures of the aforementioned U.S. patent, the relation as to what image combination is accomplished by a combination of the negative or the positive images of respective original images.

Various inconveniences arise because the original image must be a negative image. First, it is difficult to directly prepare a negative image. Further, to obtain a reversal image after having prepared a positive image, a photographic treatment is required and this involves much time and labor. Even if the treatment is effected electrophotographically, it will be necessary to prepare a device for exclusive use for reversal development. Accordingly, where an original image which is a negative image is requisite, there is an inconvenience that the finished image requires extra time to produce.

A second method disclosed in the aforementioned U.S. Patent enables utilization of an original which is a positive image. This second method comprises applying a primary charge of a predetermined polarity to a three-layered photosensitive medium, then applying a modulated light beam while applying a corona discharge having a component opposite in polarity to the primary charge, and thereafter applying an original image. The relation of the images provided by this method is shown FIG. 2 of the accompanying drawings. This method is excellent in that a combined image of high applicability is provided by a light beam modulated image which is a negative image and an original image which is a positive image.

However, for carrying out this method, it is necessary to use the aforementioned unique photosensitive medium and process means. Moreover, if the photosensitive medium itself is great in dark decay, it is difficult to maintain the effect of the application of the original image and this leads to a technical limitation that in practice, it is important to choose a photosensitive medium small in dark decay.

The present invention has been made in view of the above-noted points.

SUMMARY OF THE INVENTION

It is an object of the present invention to provide a novel image combining method and apparatus.

It is another object of the present invention to provide a method and apparatus which simply and easily enable practical image combination by utilizing a positive original image.

In image combination wherein images based on at least two different types of original information are formed in combination on a recording medium, the present invention has the steps of modulating a light beam in accordance with electrical signal information, scanning an original by the modulated light beam, and projecting onto the surface of the recording medium the light beam having scanned the original to thereby effect recording on the surface of the recording medium.

The further construction and other objects of the present invention will become apparent from the following detailed description of embodiments of the invention taken in conjunction with the accompanying drawings.

BRIEF DESCRIPTION OF THE DRAWINGS

FIG. 2 illustrates the relation between an original image and a combined image in a case based on another method according to the prior art.

DESCRIPTION OF THE PREFERRED EMBODIMENTS

Figure 3:
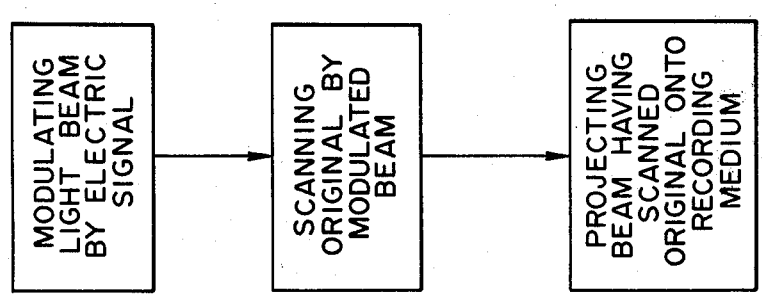
FIG. 3 is a flow chart illustrating the method of the present invention.

FIG. 3 is a flow chart illustrating the basic steps of the method of the present invention.

The method of the present invention basically has three steps. The first step is the step of modulating a light beam in accordance with electrical signal information. This step is one which can utilize the modulation of the laser beam from a well-known laser beam light source or the modulation by turn-on-and-off operation of the calescence point of of CRT or the like.

The second step is the step of scanning an original by a modulated light beam.

The scanning in this step, in the case of a laser beam light source, may utilize the scanning utilizing a single or plural mirrors. Of course, optical means such as an f-$\theta$ lens or the like is used therewith at this time. With a CRT or the like, scanning can be accomplished by the electric field action during the formation of a calescence point.

In this step, an original is scanned by a light beam already modulated and therefore, the original is illuminated only in its scanned portion when the light beam is turned on, and the original is not subjected to a substantial light in the portion when the light beam is turned off. In the portion of the original illuminated, the black portion on the original (hereinafter referred to as the dark portion D) absorbs light and as a result, no reflected light or no transmitted light can be obtained in this portion, but reflected light or transmitted light can be obtained only in the white or gray portion on the original (hereinafter referred to as the light portion L).

Accordingly, in this step, only when the light beam is turned on, that is in the irradiated portion during scanning of a light portion L of the original, is the light beam utilized as a light signal in the ensuing step. In the portion irradiated with the light beam, during scanning of a dark portion of the original or when the light beam is turned off, the light beam is utilized as a dark signal in the ensuing step.

The third step is the step of projecting the beam having scanned the original onto the surface of a recording medium to thereby effect recording on the surface of the recording medium.

Any of various electrophotographic processes may be utilized for the recording on the recording medium. For example, the Carlson process using a Carlson type photosensitive medium is advantageous in that process means are simple. Also, other various processes using a multilayered photosensitive medium having an insulating layer on the surface thereof are advantageous in durability and in that the latent image formed can be of high contrast.

Besides these, any photosensitive member such as silver salt photographic medium may of course be used as the recording medium.

Figure 1:
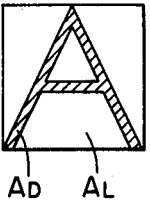
FIG. 1 illustrates the relation between an original image and a combined image in a case based on a method according to the prior art.
Figure 4:
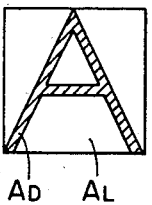
FIG. 4 illustrates the relation between an original image and a combined image in a case based on the method of the present invention.

FIG. 4 illustrates the combined image formed based on the method of the present invention, and shows the relation of the combined image formed when a modulating image having modulated the light beam and each original image of the original are negative images or positive images. As is apparent from the comparison with FIG. 1 or 2 which shows the prior art, a combined image of high applicability is obtained when both the image having modulated the light beam and the original image are positive images. Accordingly, a positive original image obtained as simply as in the case of FIG. 2 can be utilized. Moreover, in the case of FIG. 2, as is fully described in the aforementioned U.S. patent, the combined image can be realized only by the use of a unique photosensitive medium and a unique process, whereas according to the method of the present invention which is constructed as described above, the recording medium and the recording thereon are not limited at all. Furthermore, in the case of FIG. 2, a positive combined image is obtained by way of reversal development, whereas according to the method of the present invention, a positive combined image can be obtained by way of regular development. Accordingly, a conventional electrophotographic apparatus can be utilized intact for carrying out the method of the present invention, and thus, the method of the present invention has very high practical utility.

Figure 5:
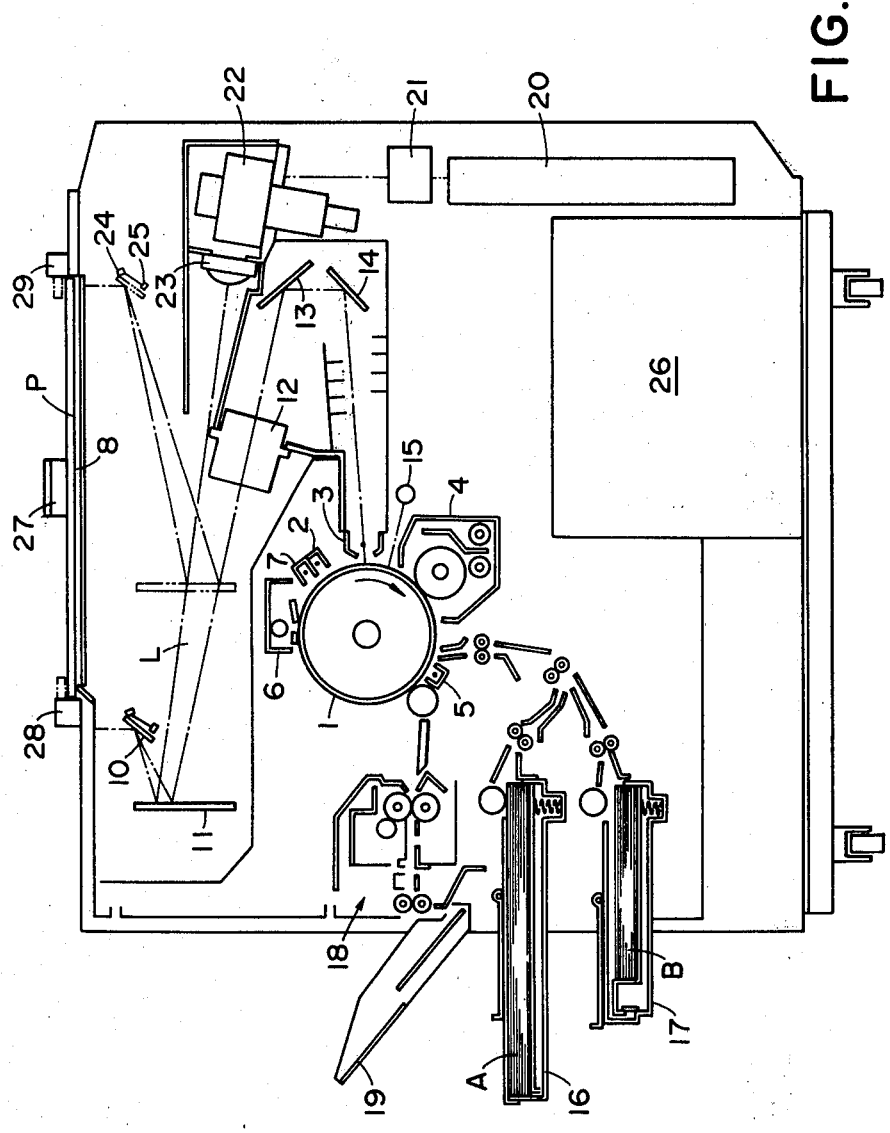
FIG. 5 is a side view of a specific embodiment of the apparatus according to the present invention.

FIG. 5 is a side view of a specific apparatus based on the present invention. Around a photosensitive drum formed on the peripheral surface thereof with a three-layer photosensitive medium 1 basically comprising an electrically conductive substrate, a photoconductive layer and an insulating layer, there are radially disposed a primary charger 2, a discharger 3 for effecting discharging simultaneously with the application of light, a developing device 4, an image transfer charger 5, a cleaner 6 and a discharger 7. Designated by 2, 3, 5 and 7 are corona dischargers having a discharge wire. Reference numeral 8 designates a light-transmitting original carriage, reference character P denotes an original, reference numeral 10 designates an original scanning mirror, reference numeral 11 denotes a mirror movable at $\frac{1}{2}$ of the velocity of the mirror 10, reference numeral 12 designates an imaging lens, and reference numerals 13 and 14 denote deflecting mirrors.

The reflected light from the original P scanned by the scanning mirror 10 is imaged on the photosensitive medium charged to the positive (+) polarity by the primary charger 2, at the position of the discharger 3, by the above-described optical system 10 through 14. By the discharging by the AC corona discharge of the discharger 3 and the whole surface exposure by a whole surface exposure lamp 15, an electrostatic image of high electrostatic contrast corresponding to the image of the original is formed on the photosensitive medium of the drum, and then toner is caused to adhere to the normal image portion (dark portion) of the electrostatic image by the developing device 4, whereby the electrostatic image is visualized.

Transfer paper A or B is fed from a cassette or a paper supply station 16 or 17 in synchronism with the image on the photosensitive medium 1 and brought into intimate contact with the photosensitive medium for movement therewith, and the toner image is transferred to the transfer paper by transfer corona discharge at the position of the image transfer charger 5, whereafter the transfer paper is separated from the photosensitive medium 1 by a separating mechanism, not shown, and is discharged into a tray 19 through a fixing station 18. The photosensitive medium 1 has any residual toner thereon removed by the cleaner 6 and is discharged by the discharger 7, whereafter the whole surface of the photosensitive medium is uniformly charged by the primary charger 2.

The above-described construction is illustrative of the known apparatus for carrying out the application NP process described in Japanese Patent Publication No. 23910/1967, but alternatively the mirrors 10 and 11 may be fixed and the original carriage 8 may be made movable. Of course, the present invention is not limited to the above-described process, but various electrophotographic processes such as the Carlson process may be utilized.

In the above-described apparatus, use is usually made of a lamp for illuminating the original, but the present invention, instead of using such lamp, scans the surface of the original by a beam light such as a laser or the like.

The copying apparatus incorporates therein, for example, an He-Ne laser oscillator 20, a modulator 21 for modulating the oscillated laser beam thereof by the output information signal of a computer, a word processor or the like, a deflector 22 such as a rotatable polygonal mirror or a vibratory mirror for deflecting the output of the modulator, a lens 23 of f-θ characteristic for imaging the beam from the deflector 22 on the surface of the original P, a beam detecting mirror 24 movable with the scanning mirror 10, a photodiode 25, etc.

The image beam L emitted from the laser device is imaged on the surface of the original P via the reflecting mirror 11 and the scanning mirror 10 and is caused to scan the surface of the original. Detecting elements 24 and 25 detect the beam on the surface of the original and transfer an image signal to the modulator 21. Designated by 26 is a portion for containing electric circuit components therein. Reference numeral 27 denotes an original carriage cover, and reference numerals 28 and 29 designate an original carriage locking mechanism designed so that a lock pin for preventing the cover from opening is projected onto the cover during laser scanning.

In the above-described construction, when the image information by the beam is imaged on the surface of the original and is caused to scan such surface with the beam turned off in the black portion thereof, if the image information is a signal representing black (absence of the beam), no light is applied to the surface of the original and thereof, there is no reflected light regardless of whether it is a black portion or the white background thereof and thus, the surface of the photosensitive medium provides a black portion. If the image information by the beam is a signal representing white, the black portion of the original appears as black on the photosensitive medium due to there being substantially no reflected laser light and the white background portion of the original appears as white on the photosensitive medium due to the reflected light.

Therefore, when an electrostatic image corresponding to the image of the original is to be formed on the photosensitive medium, the beam information appears in the same manner as in the case where the conventional original illuminating lamp is used, by scanning the original while putting out white, i.e., a beam. When it is desired that a portion of a sheet of copy paper represent the image of the original and the other portion of the copy paper represent the beam image information modulated by an electrical signal, it is possible to represent the information image in said other portion with said other portion as the white background by scanning the surface of the original corresponding to said other portion with the white beam information while controlling the black portion thereof to a beam-off condition. In the black portion thereof, the information image overlaps the black portion of the image of the original, but this results in no inconvenience.

That is, there is an effect that it is not necessary to set an area for representing the information image in the image of the original, and this is effective and appropriate as an image combining method.

While description has been made of the case of the reflected light from the original, the light beam can of course be utilized as a transmitted light in the case of a transparent original for OHP (overhead projector). The embodiment in such case will later be described fully in connection with FIG. 7.

Now, where the reflected light of the laser beam is utilized as shown in FIG. 5, even if the laser beam exits upwardly from the surface of the original carriage and is, for example, of several tens to several hundred mW, such laser beam may harm the eyes of the operator who happens to be watching the surface of the original and therefore, description will hereinafter be made of the mechanism and operation for preventing such a danger.

The original carriage cover 27 of the apparatus shown in FIG. 5 is designed such that it is lockable by a locking mechanism in its closed position wherein an original is held down, and the locked condition is maintained at least during the emission of the laser beam and the locking mechanism is released after the emission of the laser beam is stopped.

Figure 6:
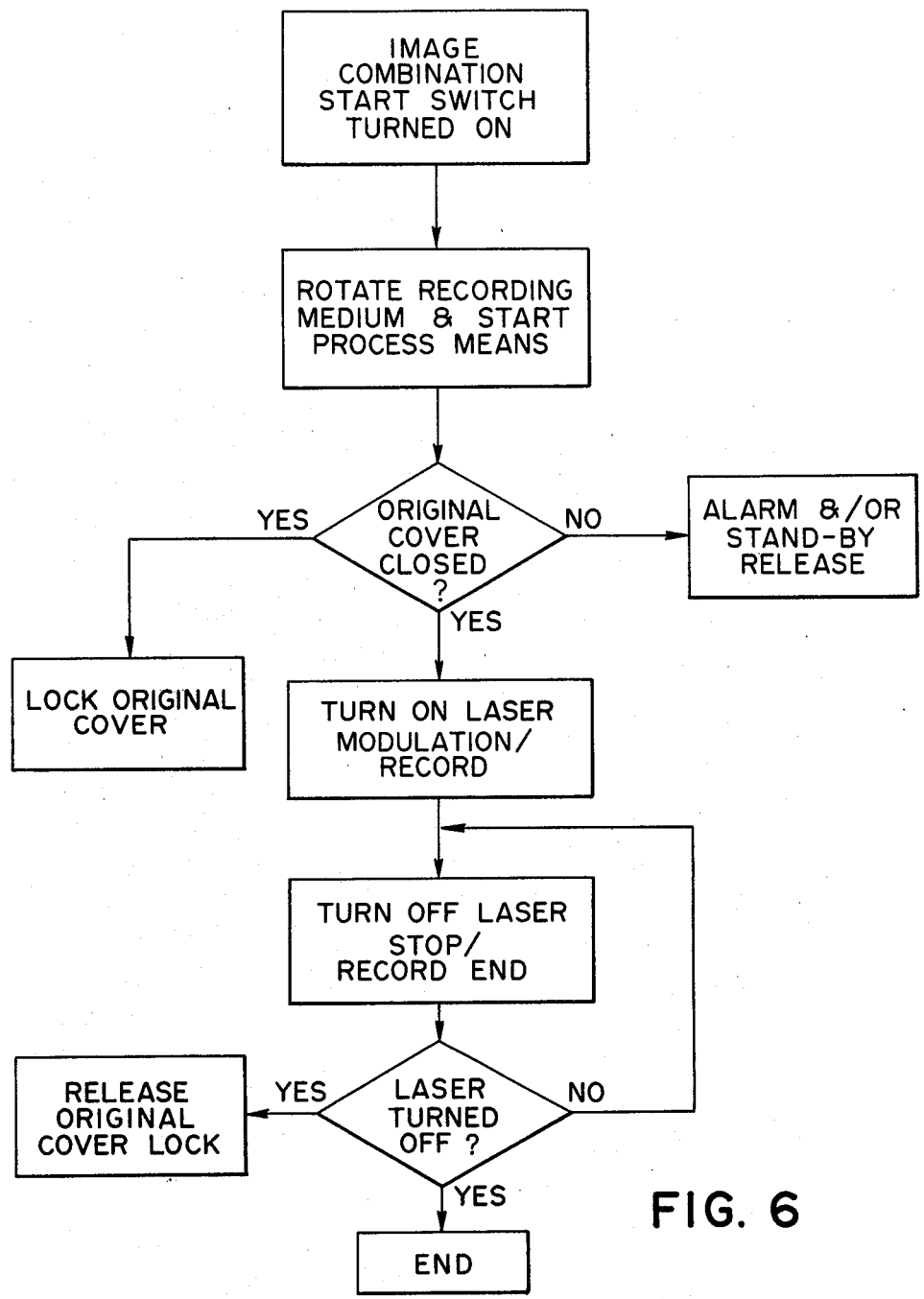
FIG. 6 is a flow chart illustrating the operation of an original carriage locking mechanism in the apparatus of FIG. 5.

FIG. 6 is a flow chart illustrating an example of the operation of such locking mechanism associated with the operation of the image combining apparatus.

As the locking mechanism for the original carriage cover, a locking member for preventing the movement of the opening-closing end of the cover may be installed and controlled by a solenoid or the like, or alternatively a similar locking member may be attached to the hinged portion of the cover. Of course, any other suitable locking mechanism may also be employed. As the detecting means for the original carriage cover, any suitable means such as a microswitch, a photoelectric element or a magnetic element may of course be used to detect the opened or closed condition of the cover.

Figure 7:
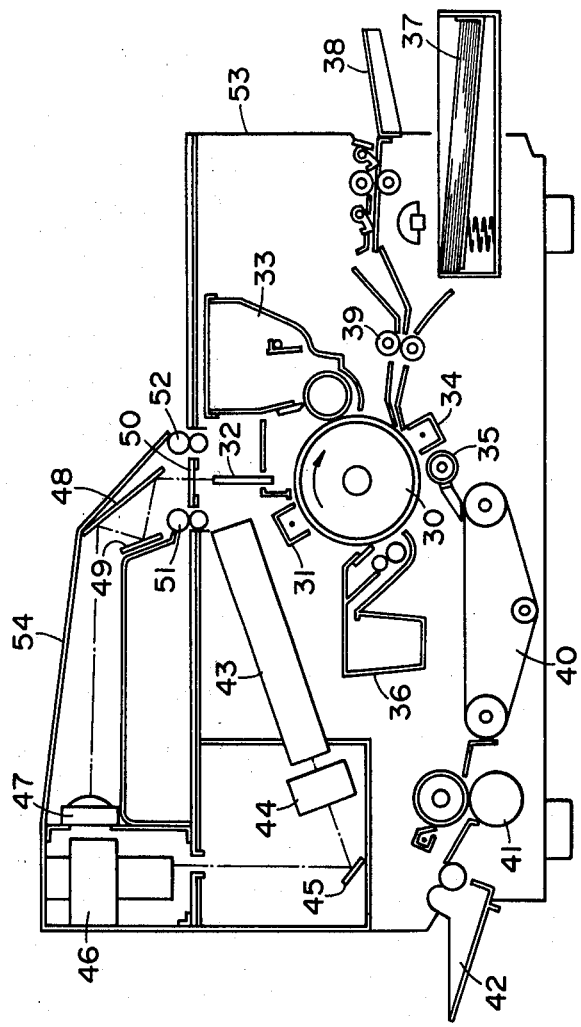
FIG. 7 is a side view of another specific embodiment of the apparatus according to the present invention.

FIG. 7 is a side view of a different embodiment of the apparatus according to the present invention. This embodiment is of a construction which utilizes the light passed through an original, as compared with the apparatus of FIG. 5 which is of a construction which utilizes the reflected light from the original.

Designated by 30 is a photosensitive drum having a Carlson type photosensitive medium installed on the surface thereof.

Around the photosensitive drum 30 which is rotatable in the direction of arrow, there are disposed a corona discharger 31, a short focus optical element array 32, a developing device 33, an image transfer corona discharger 34, a separating roller 35, a cleaning device 36, etc.

The apparatus of FIG. 7 further includes a transfer medium supply cassette 37, a manual paper supply tray 38, timing rollers 39, a belt 40 for conveying the transfer medium after image transfer, a fixing device 41, and a paper discharge tray 42. Reference numeral 43 designates a laser oscillator, and reference numeral 44 denotes a modulator. These are disposed within the housing 53 of the apparatus body. A mirror 45 is provided to direct the emergent laser beam upwardly. Within a light path box 54 provided on top of the apparatus housing 53, there are disposed a light deflector 46 having a polygonal mirror, an unshown mirror for directing the laser beam from the mirror 45 to the light deflector 46, an f-θ lens 47, and reflecting mirrors 48 and 49. Reference numeral 50 designates a transparent original holding surface, and reference numerals 51 and 52 denote conveyor rollers for conveying an original in synchronism with the rotational velocity of the drum 30.

In the apparatus of the above-described construction, the laser beam generated by the laser oscillator 43 is modulated by a modulator so that it is turned off at a signal portion in accordance with a desired video signal. The modulated laser beam is deflected and scanned by the light deflector 46 via the reflecting mirror 45, etc. The deflected and scanned laser beam passes through the f-θ lens 47 and via the mirrors 48 and 49 and scans the original on the transparent original holding surface widthwise thereof.

This scanning beam is projected onto the surface of the photosensitive drum 30 through the short focus optical element array 32 on the back side of the transparent original holding surface. The surface of the photosensitive drum 30 is pre-charged to a predetermined polarity by the corona discharger 31, so that the light portion charge disappears by the projection of the original scanning beam and the dark portion charge alone remains on the surface of the photosensitive drum, whereby an electrostatic latent image is formed thereon. The formed electrostatic latent image is transferred to a transfer medium through the developing and image transfer steps, and the transferred image is fixed to complete the formation of a combined image, as in the previously described specific embodiment.

In the case of the present embodiment which utilizes the light passed through the original, such a construction is possible that the influence of the laser beam is not basically imparted to the operator and therefore, the locking mechanism as employed in the apparatus of FIG. 5 is not necessary.

Again in the above-described embodiment, a readily obtained positive image may be utilized as an original and therefore, a combined image can be obtained very simply as in the previously described embodiment.

What I claim is:

1. An image combining method for forming a combined image on a recording medium based on at least two different types of image information, comprising the steps of:
modulating a light beam in accordance with electrical signal information constituting a first type of image information;
scanning an original carrying a second type of image information with the modulated light beam; and
projecting the light beam, after having scanned the original, onto the surface of the recording medium to thereby effect recording on the surface of the recording medium of the first and second types of image information.

2. An image combining method according to claim 1, wherein in said step of modulating the light beam, the light beam is subjected to a modulation for reproducing a negative image in which the light beam is turned off in a signal portion and turned on in a background portion.

3. An image combining method according to claim 1 or 2, wherein the second type of image information carried by the original used in said step of scanning the original is a positive image.

4. An image combining method according to claim 1, wherein in said projecting step, the light beam having scanned the original is transmitted through the original and is thereafter projected onto the surface of the recording medium.

5. An image combining method according to claim 1, wherein in said projecting step, the light beam having scanned the original is reflected from the original and is thereafter projected onto the surface of the recording medium.

6. An image combining method according to claim 1 or 2, wherein the light beam in said step of modulating the light beam is a laser light emitted from a laser light source.

7. An image combining apparatus for forming a combined image on a recording medium based on at least two different types of image information, comprising:
means for generating a light beam modulated in accordance with electrical signal information constituting a first type of image information;
original holding means for holding an original that carries a second type of image information;
means for directing the light beam from said light beam generating means so as to scan an original held by said original holding means;
a recording medium; and
means for projecting onto the surface of said recording medium the light beam, after having scanned the original held by said original holding means.

8. An image combining apparatus according to claim 7, wherein said light beam generating means accomplishes a modulation in which the light beam is turned off in a reproduction information portion and turned on in a non-information portion.

9. An image combining apparatus according to claim 7, wherein said projecting means projects the light of the light beam, for transmission through the original to scan the original.

10. An image combining apparatus for forming a combined image on a recording medium based on at least two different types of image formation, comprising:
an original supporting surface for supporting an original thereon;
a laser light source for irradiating said original supporting surface;
an original supporting surface cover; and
original supporting surface cover locking means.

11. An image combining apparatus according to claim 10, wherein said locking means maintains its locking operation during the on condition of said laser light source.

12. An image combining apparatus according to claim 10, further having means for detecting the opening-closing of said original supporting surface cover.

13. An image combining apparatus according to claim 7, wherein said projecting means projects the light of said light beam for reflection by the original to the recording medium.

14. A method of forming on a recording medium a combined image based on different pieces of information, comprising the steps of:
scanning one piece of information with a beam containing a second piece of information; and
applying the beam which has scanned said one piece of information, to a surface of the recording medium.

15. A device for forming on a recording medium a combined image based on different pieces of information, comprising:
means for generating a beam containing one piece of information;
means for scanning a second piece of information with the beam containing said one piece of information; and
means for applying the beam which has scanned said second piece of information, to the recording medium.

* * * * *